United States Patent [19]

Valley

[11] Patent Number: 4,678,002
[45] Date of Patent: Jul. 7, 1987

[54] FAUCET VALVE WITH ADJUSTABLE STEM TIGHTENER

[76] Inventor: Harold J. Valley, 23462 Coso, Mission Viejo, Calif. 92692

[21] Appl. No.: 732,611

[22] Filed: May 10, 1985

[51] Int. Cl.[4] .................... F16K 43/00; F16K 5/08; F16K 41/00
[52] U.S. Cl. ................ 137/315; 137/454.5; 137/454.6; 137/625.31; 137/801; 251/208; 251/214; 251/310; 251/316
[58] Field of Search ............ 137/315, 603, 605, 801, 137/625.31, 614.11, 454.5, 454.6; 251/205, 208, 214, 304, 310, 368, 316

[56] References Cited

U.S. PATENT DOCUMENTS

| | | | |
|---|---|---|---|
| 862,985 | 8/1907 | Minter | 137/625.31 |
| 1,106,933 | 8/1914 | Farley | 251/214 |
| 1,856,825 | 5/1932 | Alphonso | 137/625.31 |
| 2,310,558 | 2/1943 | Teeters et al. | 251/214 |
| 3,207,181 | 9/1965 | Willis | 251/208 |
| 3,831,621 | 8/1974 | Anthony et al. | 137/625.31 |
| 3,910,553 | 10/1975 | Boylan | 251/214 |
| 4,250,912 | 2/1981 | Knapp | 251/208 |
| 4,331,176 | 5/1982 | Parkison | 137/625.31 |
| 4,360,040 | 11/1982 | Cove et al. | 251/208 |
| 4,426,093 | 1/1984 | Roush | 251/214 |

Primary Examiner—George L. Walton
Attorney, Agent, or Firm—Herbert E. Haynes, Jr.

[57] ABSTRACT

A washerless faucet valve, of the type having a matched pair of discs mounted therein for flow control purposes, is provided with an adjustable structure for applying frictional forces to the valve stem which allows the faucet valve to be mounted in a horizontal attitude with a control lever mounted on the extending end of the valve stem.

4 Claims, 3 Drawing Figures

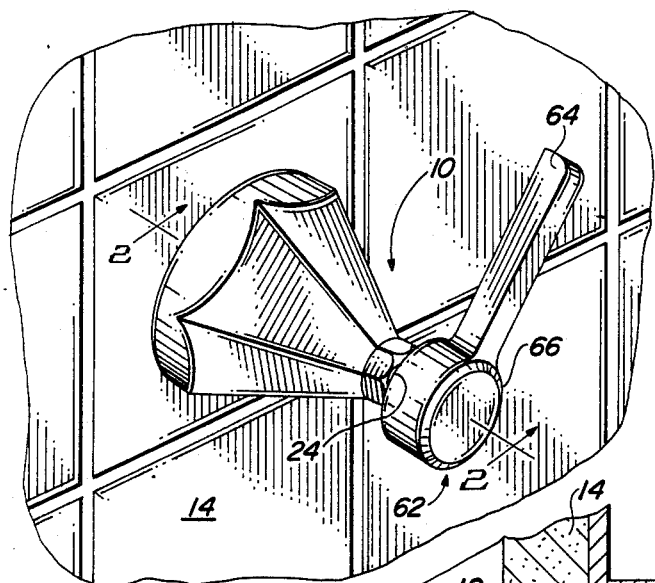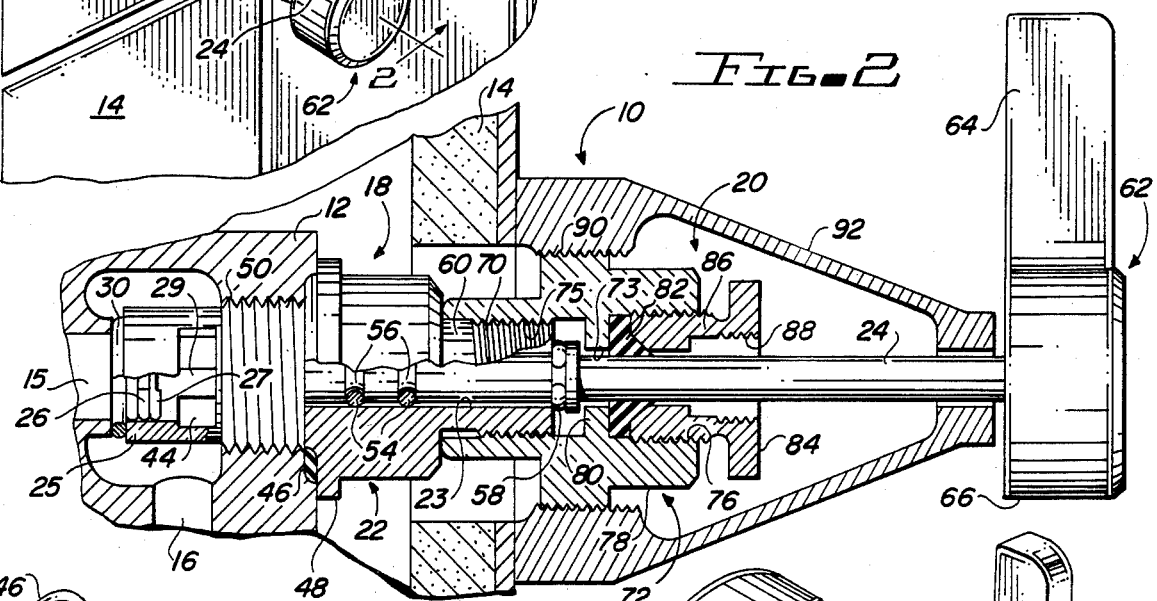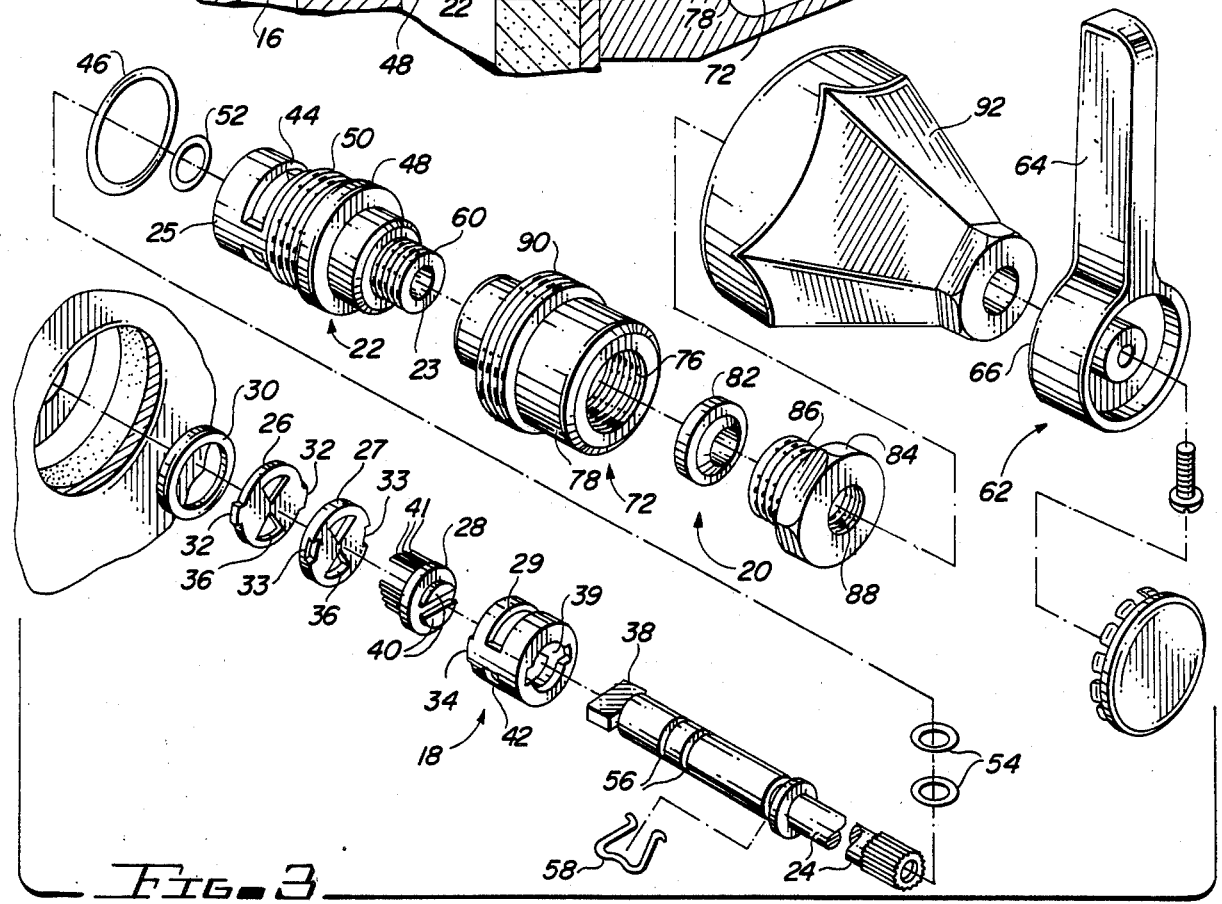

FAUCET VALVE WITH ADJUSTABLE STEM TIGHTENER

BACKGROUND OF THE INVENTION

1. Field of the Invention

This invention relates in general to water faucets and more particularly to a washerless faucet of the type employing ceramic discs for flow control purposes in combination with an adjustable stem tightening structure which prevents unintentional rotational opening of the valve when mounted in a horizontal attitude and having a control lever mounted thereon.

2. Description of the Prior Art

For many years, water faucets used valves of the type having threaded stems that were axially moved in internally threaded bores provided in the valve body. A washer is demountably carried on the innermost end of the stem and is axially movable with the stem into seated and out of seated engagement with a valve seat provided within the valve body. It is well known that seat damage, washer wear and/or damage, corrosion, and the like, are weaknesses of this type of valve which make them prone to leakage and other operational difficulties which require relatively frequent maintenance and repair.

For these well known reasons, a relatively new general type of faucet valve has been developed and this faucet valve, which is becoming increasingly used, is known generally in the art as a washerless faucet valve.

One particular type of washerless faucet valve utilizes a matched pair of contiguously disposed ceramic discs one of which is held against rotation in a valve housing with the other being coupled for rotation with a rotatably movable valve stem carried in a smooth bore formed in the valve housing. Rotation of the valve stem through approximately 90 degrees of rotation will move matching apertures provided in the two discs into alignment for flow control purposes and out of alignment for shutoff purposes. The valve stem carries a spaced pair of O-ring type seals which engage the smooth bore of the valve body and prevent leakage around the stem.

This particular valve is an excellently operating structure which is virtually maintenance free. However, it cannot be mounted in a horizontal attitude with a control lever mounted on the extending end of the valve stem. The weight of the laterally extending handle portion of the control lever applies rotational forces on the valve stem and the friction of the O-ring type seals is insufficient to keep the stem from rotating to the open position. This problem is particularly bad whenever vibrations occur in the water pipes or the wall structure in which the faucet is mounted.

For this reason, this otherwise excellent faucet valve is limited to vertical installations, or to horizontal installations which employ a round control knob rather than a control lever.

Therefore, a need exists for an adjustable valve stem tightening structure for use in combination with the above described faucet valve which overcomes that shortcoming of the faucet valve.

SUMMARY OF THE INVENTION

In accordance with the present invention, a new and useful valve stem tightening structure for use in combination with a particular type of rotary water faucet valve is disclosed. The particular faucet valve is of the type having a matched pair of contiguously disposed ceramic discs one of which is held against rotation in a valve body with other disc being coupled for rotation with a valve stem that is rotatably carried in a bore provided in the valve body. The faucet valve is moved between its open and closed positions by rotation of the valve stem through approximately 90 degrees of rotation which moves matching apertures provided in the two discs into and out of alignment for water flow and shut off purposes. The faucet valve is externally threaded on one end for threaded insertion into the faucet body in the usual manner. And, in accordance with the present invention, is also externally threaded on its opposite extending end for receiving the stem tightening means of the present invention.

The stem tightening means preferably includes an adapter fitting which is threadingly mounted on the extending end of the faucet valve body and has an axial bore through which the valve stem extends. The distal end of the adapter fitting is counterbored to form a ring-shaped shoulder in the bottom thereof and the counterbore is internally threaded. An elastomeric friction ring is located in the counterbore so as to be concentric with the valve stem and in contiguous seated engagement with the shoulder, and a compression nut is threadingly carried in the counterbore. Threaded movements of the compression nut are employed to adjustably vary the compressive forces applied axially on the friction ring, and the amount of compressive forces exerted determines the amount of frictional forces applied circumferentially on the valve stem.

In this manner, the above described faucet valve can be mounted in a horizontal attitude with a control lever on the extending end of the valve stem, and the adjustable valve stem tightening capability can be set to counteract the undesirable rotational forces applied by virtually any style and configuration of control lever.

Accordingly, it is an object of the present invention to provide a new and useful faucet valve with an adjustable valve stem tightener means.

Another object of the present invention is to provide a new and useful washerless faucet valve of the type controlled by a rotatable valve stem in combination with an adjustable valve stem tightening means.

Another object of the present invention is to provide a new and useful combination of the above described character wherein the valve stem tightening means allows the faucet valve to be mounted in a horizontal attitude with a control lever mounted on the extending end of the valve stem.

The foregoing and other objects of the present invention, as well as the invention itself, may be more fully understood from the following description when read in conjunction with the accompanying drawings.

BRIEF DESCRIPTION OF THE DRAWINGS

FIG. 1 is a perspective view showing a typical installation of the faucet valve in combination with the adjustable stem tightening means of the present invention.

FIG. 2 is an enlarged sectional view taken along the line 2—2 of FIG. 1.

FIG. 3 is an exploded perspective view showing the various components of the faucet valve and the stem tightening means.

DESCRIPTION OF THE PREFERRED EMBODIMENT

Referring more particularly to the drawings, FIGS. 1 and 2 best show a typical mounting arrangement of the faucet valve with stem tightening means of the present invention, hereinafter referred to as the valve assembly, which is indicated generally by the reference numeral 10.

Typically, the faucet valve assembly 10 is threadingly mounted in a faucet body 12 that is mounted within a wall structure 14 and is suitably connected to plumbing lines (not shown) which supply water under pressure to the inlet port 15 of the faucet body 12 and direct that water, under control of the faucet valve assembly 10, to an outlet port 16 of the faucet body.

The faucet valve assembly 10 includes two generally indicated mechanisms which are the faucet valve 18 per se, and the adjustable valve stem tightening means 20, and those two mechanisms cooperatively form the combination of the present invention.

It is to be understood that the faucet valve 18 is a well known mechanism and the present inventor makes no claim on that mechanism. However, the faucet valve 18 will now be described to insure a complete understanding of the combination of the present invention.

The faucet valve 18 includes a valve housing 22 having an axial bore 23 in which a valve stem 24 is rotatably mounted, and the housing 22 has a counterbored end 25 which contains a fixed disc 26, rotary disc 27, noise suppressor 28 and coupler 29. The counterbored end 25 carries an O-ring type seal 30 which is in bearing sealed engagement with the faucet body 12 (FIG. 2) to prevent leakage between the inlet port 15 of the faucet body 12 and the inlet end of the faucet valve 18. The fixed disc 26 is provided with a diametrically opposed pair of ears 32 which fit within appropriate grooves (not shown) provided in the counterbored end 25 of the housing 22. The rotary disc 27 has diametrically opposed recesses 33 which engage the axially extending ears 34 (one shown) of the coupler 29 for rotation of the rotary disc 27 as will become apparent as this description progresses. Both of the discs 26 and 27 are provided with apertures 36 for water flow control purposes, e.g., when the apertures are in alignment, water will flow therethrough, and when out of alignment, the valve will be shut off. These discs 26 and 27 are formed of ceramic material and their mating surfaces are highly polished to prevent leakage between those surfaces.

The inner end of the valve stem 24 has a cross bar 38 thereon which is disposed in the slotted end 39 of the coupler 29 so that a portion thereof extends into the coupler. That extending portion of the cross bar 38 is in mating engagement with a spaced apart pair of protrusions 40 formed on the end of the noise suppressor 28. Thus, rotary motion of the valve stem 24 will rotatably move both the noise suppressor 28 and the coupler 29 and the latter of these parts will move the rotary disc 27 by virtue of the mating engagement of the coupler's ears 34 with the recesses 33 of the rotary disc 27.

The noise suppressor 28 is a disc-shaped structure having fingers 41 extending axially therefrom which suppresses noise which can occur when the discs 26 and 27 are disposed for permitting low water flow rates therethrough. The coupler 29 has diametrically opposed lateral slots 42 (one shown) which are in alignment with similar slots 44 provided in the counterbored end 25 of the housing 22. These slots 42 and 44 are always open regardless of the rotary position of the faucet valve 18 so that when the valve is open, the water flow path defined by said body will be open and water will flow into the axially open end of the counterbored end 25 of the housing 22 and will flow out the slots 42 and 44 to the outlet port 16 of the faucet body 12.

As seen best in FIG. 2, an O-ring type seal 46 is disposed between the faucet body 12 and an annular flange 48 provided on the valve housing 22 to prevent leakage past the threads 50 which are used to mount the faucet valve 18 in the faucet body 12. A smaller O-ring type seal 52 (FIG. 3) is seated in the bottom end of the counterbored end 25 of the valve housing 22 and the slotted end 39 of the coupler 29 is seated on that O-ring type seal 52 to prevent leakage past the coupler 29 into the bore 23 of the housing 22. As a further precaution against leakage past the valve stem 24, a spaced apart pair of O-ring type seals 54 are carried in suitable annular grooves 56 formed in the valve stem 24.

The two discs 26 and 27, the noise suppressor 28, the coupler 29 and the valve stem 24 are assembled in the valve housing 22 from the counterbored end 25 thereof, and a snap-ring 58 is employed to hold the entire assembly in place, with the valve stem 24 extending axially from the extending end 60 of the valve housing.

As hereinbefore described in detail, the above described faucet valve 18 is a well known structure having excellent operating characteristics and is virtually trouble free. However, it cannot be mounted in a horizontal attitude with a control lever, such as that shown at 62, mounted on the extending end of the valve stem 24. The control lever 62, as opposed to a round knob (not shown), is provided with a handle portion 64 which extends laterally from the control lever body 66, and that handle portion exerts rotary forces on the valve stem 24 when the faucet valve 18 is mounted in a horizontal attitude as shown. The unwanted exertion of rotary forces on the valve stem 24 will cause the valve to move to its open position and this, of course, results in leakage.

For this reason, the well known faucet valve 18 is modified by providing external threads 70 on the extending end 60 thereof, and the stem tightening means 20 is mounted thereon.

As seen best in FIG. 2, the adjustable valve stem tightening means 20 includes an adapter fitting 72 defining a bore 73 through which the valve stem 24 extends axially. The fitting 72 is provided with a first counterbored end 75 which is internally threaded for mounting thereof on the extending end 60 of the valve housing 22. A second counterbore 76 is provided on the distal end 78 of the adapter fitting 72 and this counterbore 76 forms a ring-shaped shoulder 80 in the bottom of the counterbore, and the counterbore is internally threaded.

An elastomeric friction ring 82 is disposed in the bottom of the counterbore 76 so as to be in seated engagement with the shoulder 80 and coaxially arranged relative to the valve stem 24. A compression nut 84 having an enlarged head and an externally threaded axially extending boss 86 is threadingly mounted in the counterbore 76 and has an axial bore 88 through which the valve stem 24 passes.

Threaded movements of the compression nut in the counterbore 76 will exert axial compression forces on the elastomeric friction ring 82 and this will cause the friction ring to swell radially. When the ring swells radially, its outer surface will move into tight engagement with the sidewall of the counterbore 76 and its inner surface will also swell inwardly into frictional engagement with the periphery of the valve stem 24. It is this frictional engagement of the friction ring 82 on the valve stem 24 which is used to counteract the unwanted rotational forces applied by the control lever 62.

The adapter fitting may be provided with external threads 90 for mounting of a decorative cover 92 on the valve assembly 10 as is customary in the art.

While the principles of the invention have now been made clear in the illustrated embodiment, there will be immediately obvious to those skilled in the art, many modifications of structure, arrangements, proportions, the elements, materials and components used in the practice of the invention, and otherwise, which are particularly adapted to specific environments and operation requirements, without departing from those principles. The appended claims are therefore intended to cover and embrace any such modifications within the limits only of the true spirit and scope of the invention.

What I claim is:

1. A ceramic disc faucet valve with stem tightening means which allows said faucet valve to be mounted in a horizontal attitude with a control lever having a laterally extending handle portion mounted thereon; said faucet valve with stem tightening means comprising in combination:

(a) a faucet valve including,
      I. a valve body for mounting on a vertical surface and defining a water flow path therethrough,
      II. a valve stem mounted in said valve body and having an elongated portion of uninterrupted cylindrical configuration extending axially therefrom, said valve stem being rotatable about a horizontal axis,
      III. a matching pair of ceramic discs mounted in contiguous engagement with each other within the flow path of said valve body, a first one of said pair of discs being held against rotation in said valve body and a second one of said pair of discs being coupled for rotation with said valve stem about the horizontal axis, each of said pair of discs having at least one aperture formed therethrough so that reciprocal rotation of said second one of said discs through approximately 90 degrees will align and misalign the apertures of said pair of discs for opening and closing of the flow path through said valve body;

(b) a valve stem tightening means on said valve body and extending axially therefrom in circumscribing relationship with said valve stem, said valve stem tightening means being in frictional engagement with the periphery of the cylindrical extending portion of said valve stem to prevent unwanted rotational movement thereof; said valve stem tightening means includes means surrounding at leas a portion of said valve stem which is adjustable for varying the amount of friction applied radially and inwardly thereby on said valve stem, a cover means surrounding said tightening means and said adjustable means to prevent any tampering thereto; and (c) a control lever mounted on the extending end of said valve stem for manual manipulation thereof, said control lever including a lever body which is mounted on the extending end of said valve stem and an elongated handle portion extending laterally from said lever body.

2. The combination of claim 1 wherein said valve stem tightening means comprises:

(a) an adapter fitting on the extending end of said valve body and having a bore through which said valve stem extends axially, said adapter fitting having a counterbore formed in its distal end;

(b) an elastomeric friction ring in the bottom of the counterbore of said adapter fitting and being coaxial circumscribing relationship with said valve stem; and (c) a compression nut mounted in the counterbore of said adapter fitting and having an axial bore through which said valve stem extends, said compression nut applying axial compression forces on said friction ring to swell it radially and inwardly into frictional engagement with said valve stem.

3. The combination of claim 2 wherein the counterbore of said adapter fitting is internally threaded and said compression nut has an externally threaded boss extending axially from an enlarged head, said compression nut being threadingly movable in the counterbore of said adapter fitting for adjustably varying the amount of friction applied on said valve stem.

4. The combination of claim 1 wherein said adapter fitting is demountably mounted on the end of said valve body from which said valve stem extends.

* * * * *